(12) United States Patent
van der Made

(10) Patent No.: US 8,250,011 B2
(45) Date of Patent: Aug. 21, 2012

(54) AUTONOMOUS LEARNING DYNAMIC ARTIFICIAL NEURAL COMPUTING DEVICE AND BRAIN INSPIRED SYSTEM

(76) Inventor: Peter A J van der Made, Gosnells (AU)

( * ) Notice: Subject to any disclaimer, the term of this patent is extended or adjusted under 35 U.S.C. 154(b) by 815 days.

(21) Appl. No.: 12/234,697

(22) Filed: Sep. 21, 2008

(65) Prior Publication Data

US 2010/0076916 A1     Mar. 25, 2010

(51) Int. Cl.
*G06N 5/00*     (2006.01)
(52) U.S. Cl. .......................................... 706/27; 706/45
(58) Field of Classification Search ................ 706/27, 706/45
See application file for complete search history.

(56) References Cited

OTHER PUBLICATIONS

Indiveri, et al., A VLSI array of low-power spiking neurons and bistable synapses with spike-timing dependent plasticity, IEEE Transactions on Neural Networks, vol. 17, No. 1, Jan. 2006, pp. 211-221.*

* cited by examiner

*Primary Examiner* — Wilbert L Starks
(74) *Attorney, Agent, or Firm* — Kilpatrick Townsend & Stockton LLP

(57) ABSTRACT

A hierarchical information processing system is disclosed having a plurality of artificial neurons, comprised of binary logic gates, and interconnected through a second plurality of dynamic artificial synapses, intended to simulate or extend the function of a biological nervous system. The system is capable of approximation, autonomous learning and strengthening of formerly learned input patterns. The system learns by simulated Synaptic Time Dependent Plasticity, commonly abbreviated to STDP. Each artificial neuron consisting of a soma circuit and a plurality of synapse circuits, whereby the soma membrane potential, the soma threshold value, the synapse strength and the Post Synaptic Potential at each synapse are expressed as values in binary registers, which are dynamically determined from certain aspects of input pulse timing, previous strength value and output pulse feedback.

19 Claims, 15 Drawing Sheets

PSP circuit

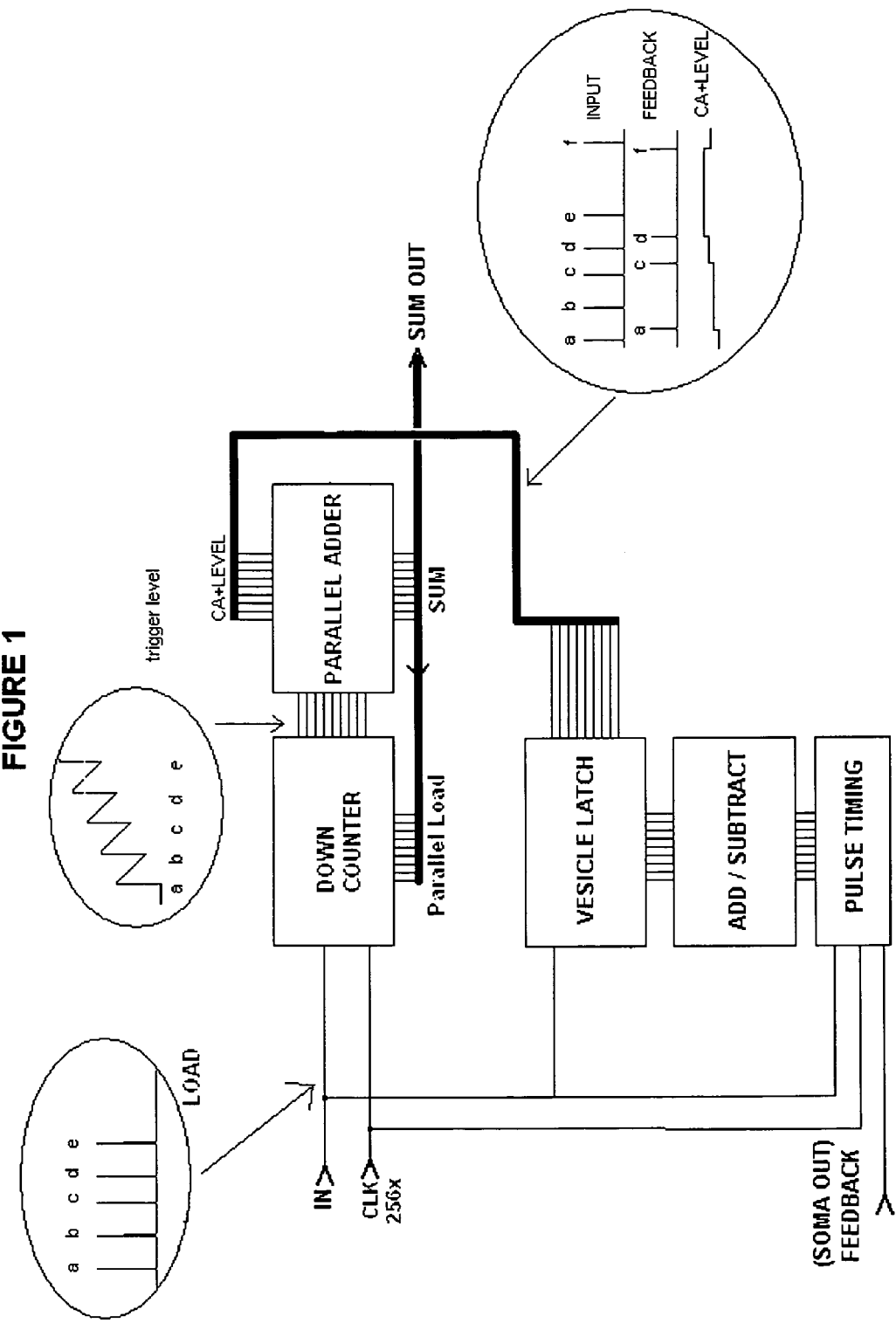

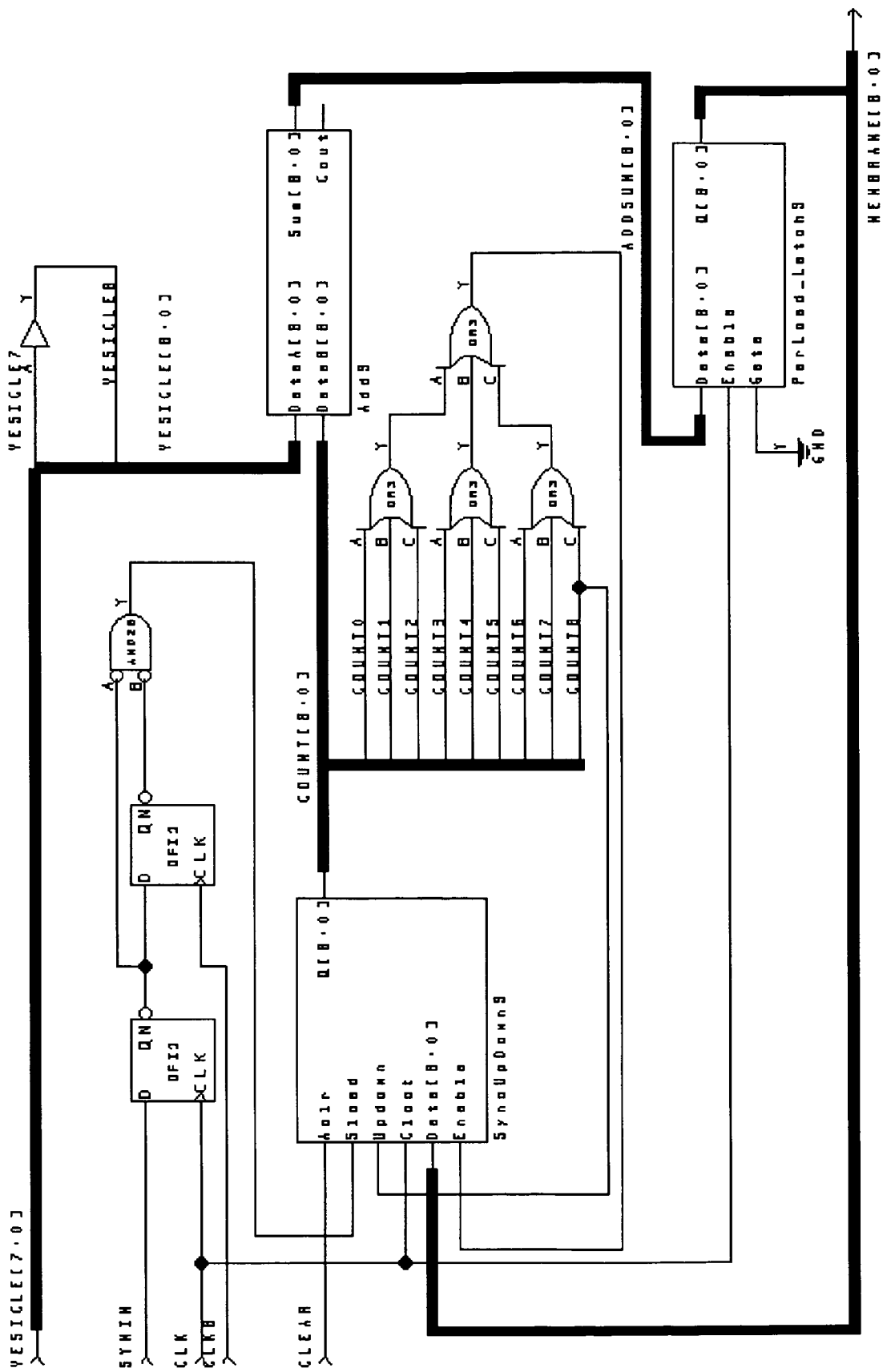
Figure 1a PSP circuit

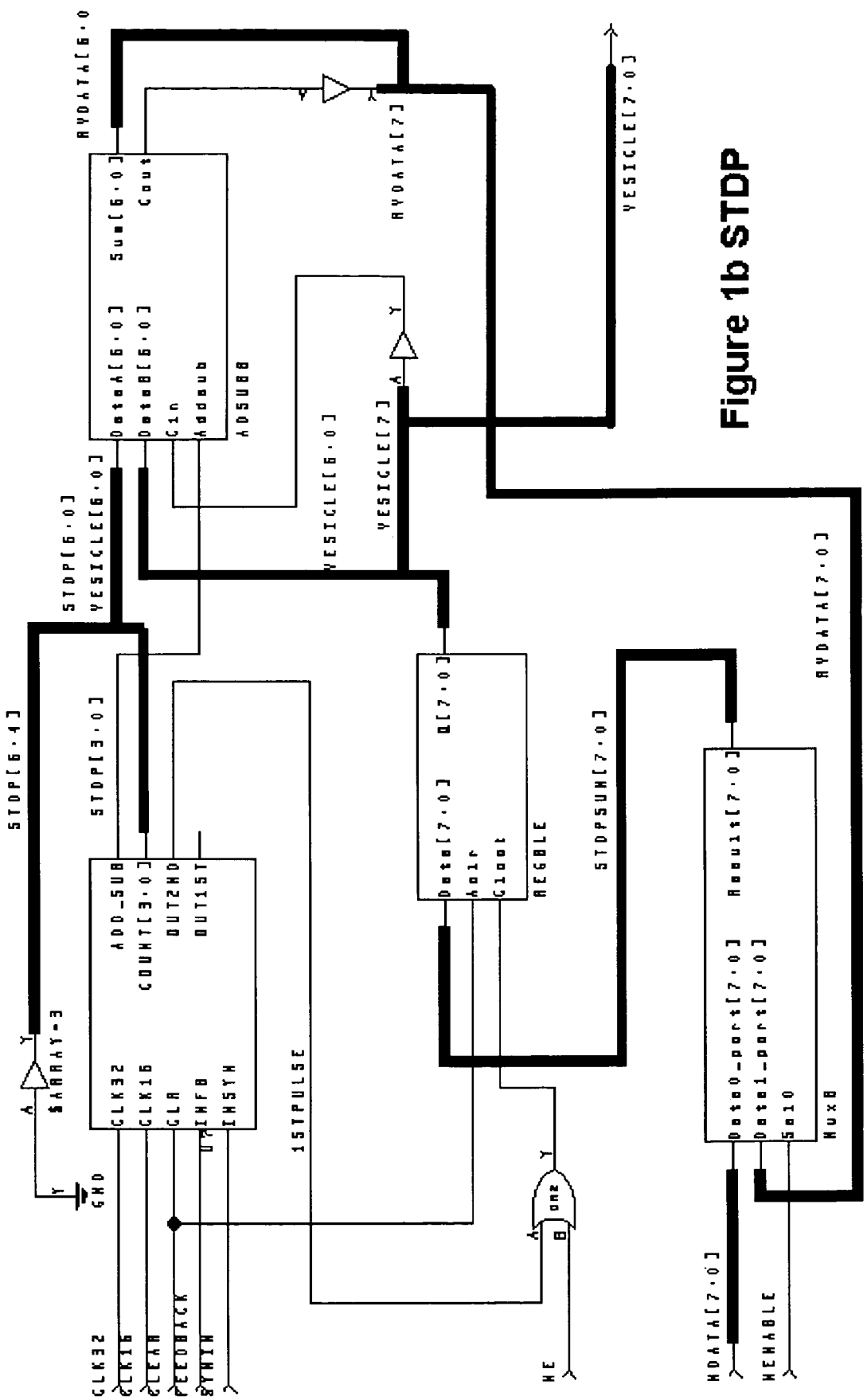
Figure 1b STDP

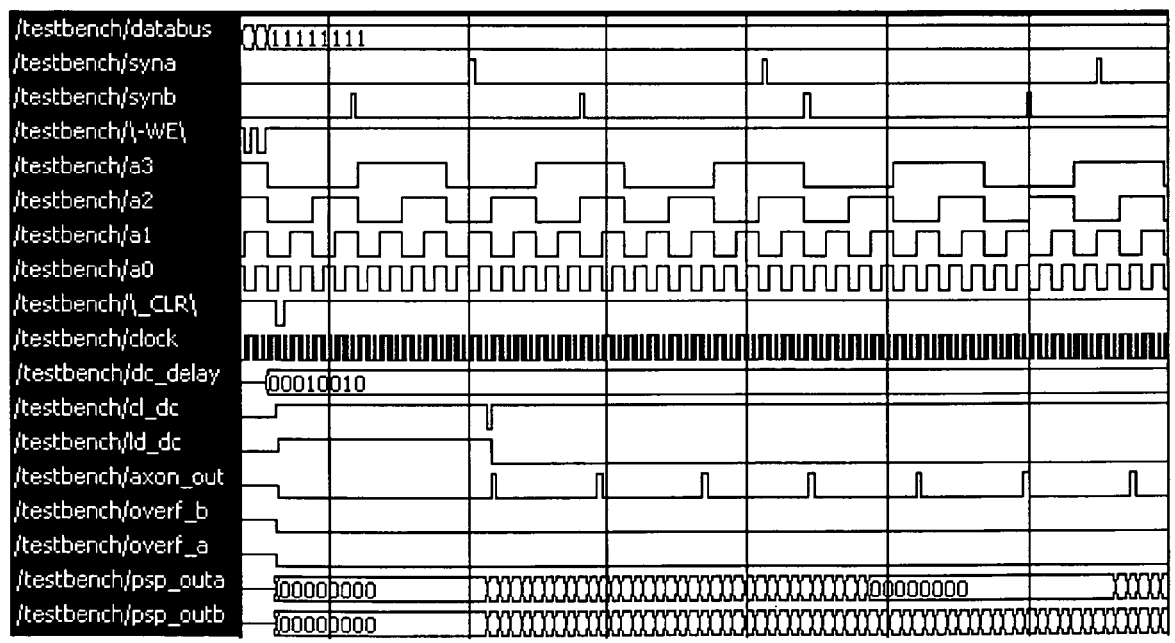
FIGURE 1C LOGIC SIMULATOR SCREENSHOT OF
ARTIFICIAL NEURON WAVEFORM CHART

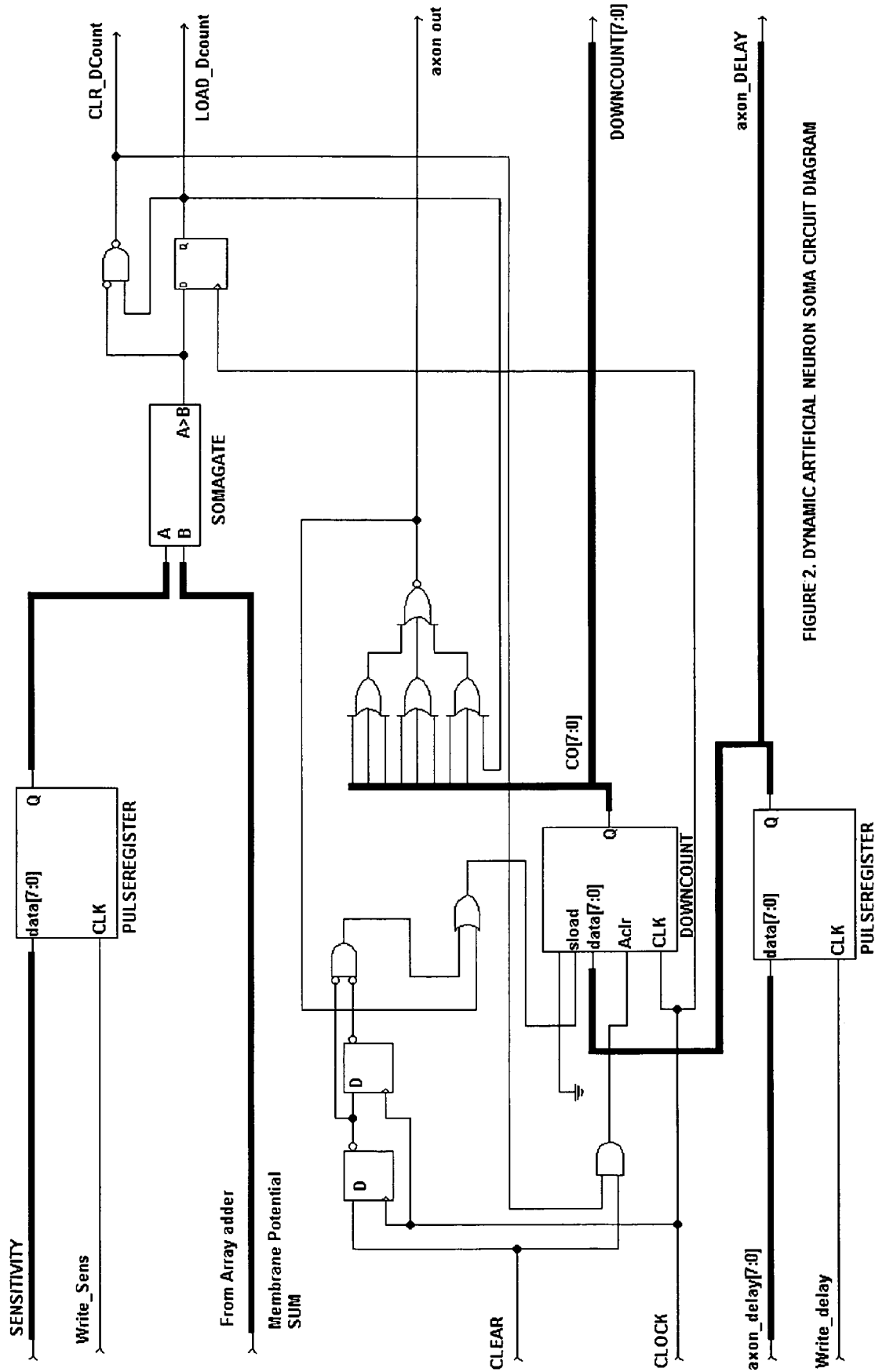
FIGURE 2. DYNAMIC ARTIFICIAL NEURON SOMA CIRCUIT DIAGRAM

Block Diagram
Soma Circuit
Digital Dynamic Neuron

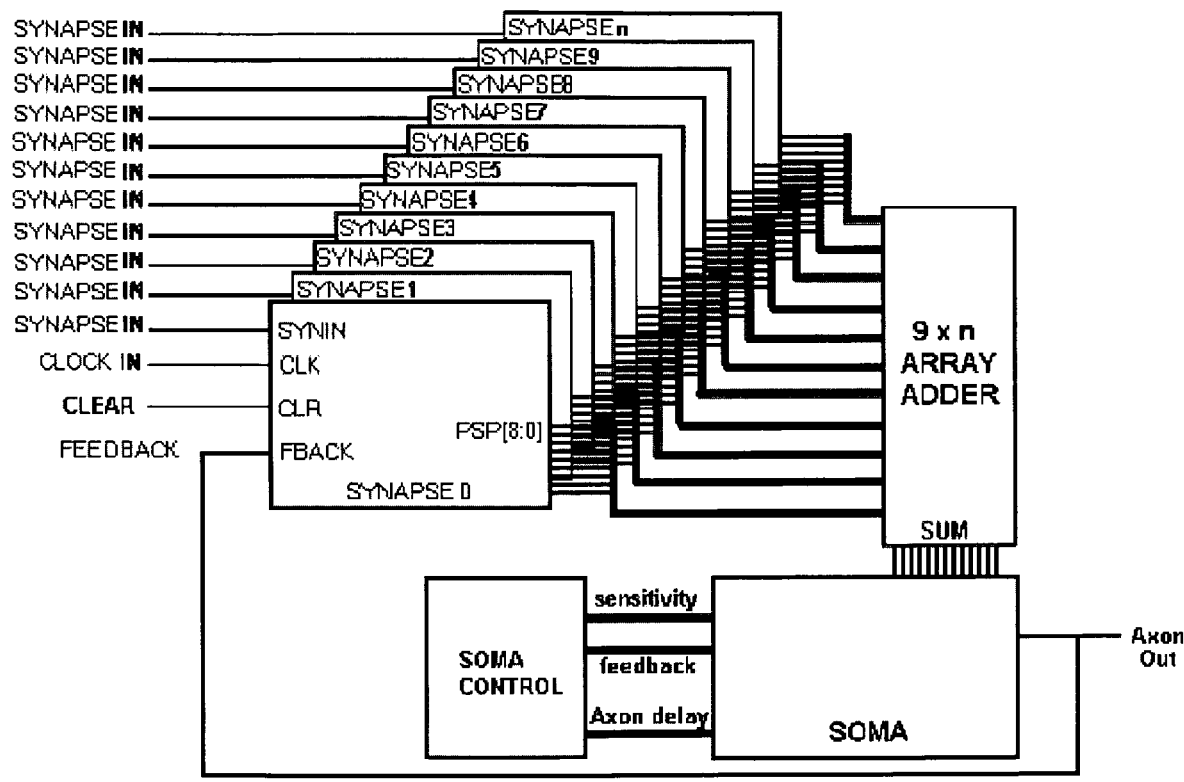
FIGURE 3. SYNAPSES CONNECTED TO SOMA IN ARTIFICIAL NEURON

Dynamic Artificial Neuron
BLOCK DIAGRAM

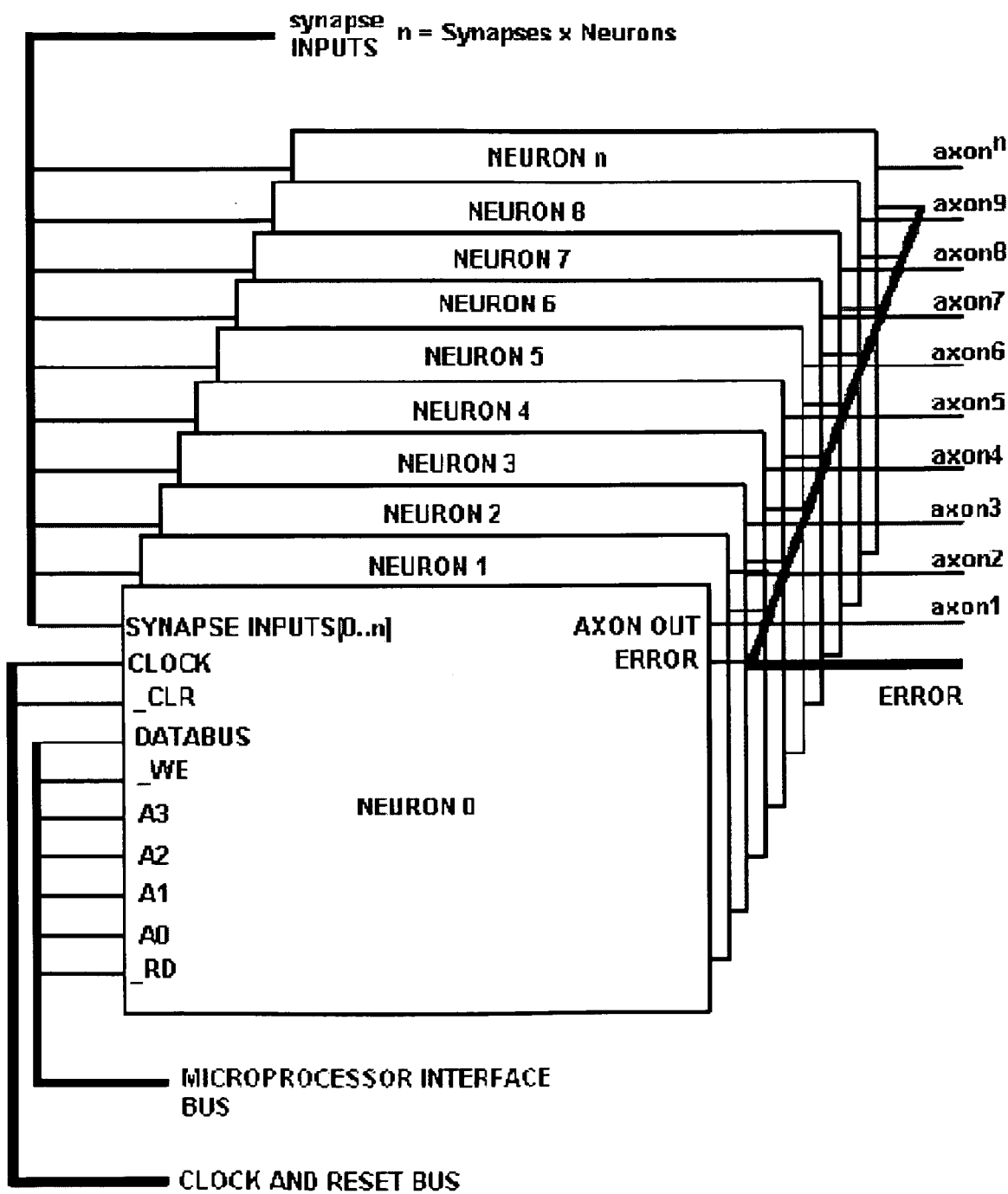

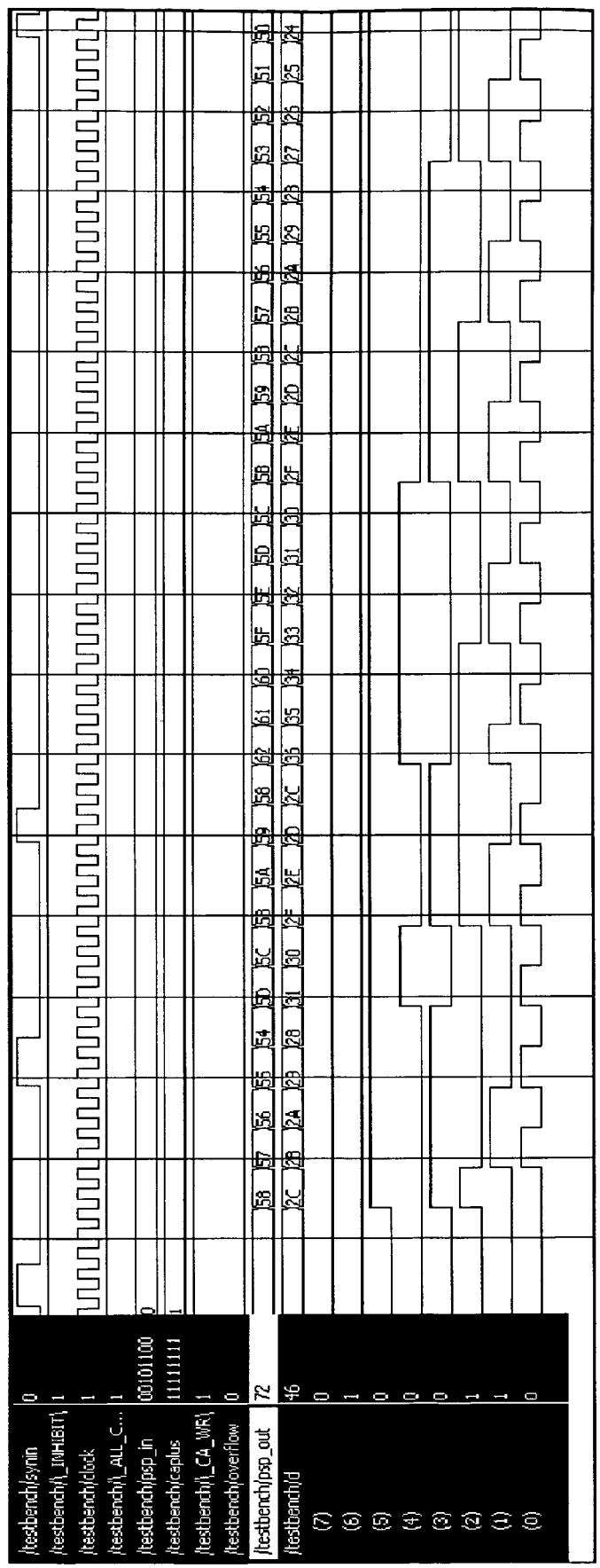
Figure 5: Artificial Neuron: CAD System screenshot of Synapse circuit simulation Synapse Input and Soma (Axon) output

FIGURE 7: RESPONSE OF EACH SYNAPSE BEFORE INTEGRATION

SYNAPSE TIME DEPENDENT PLASTICITY

Artificial Neuron Membrane Potential

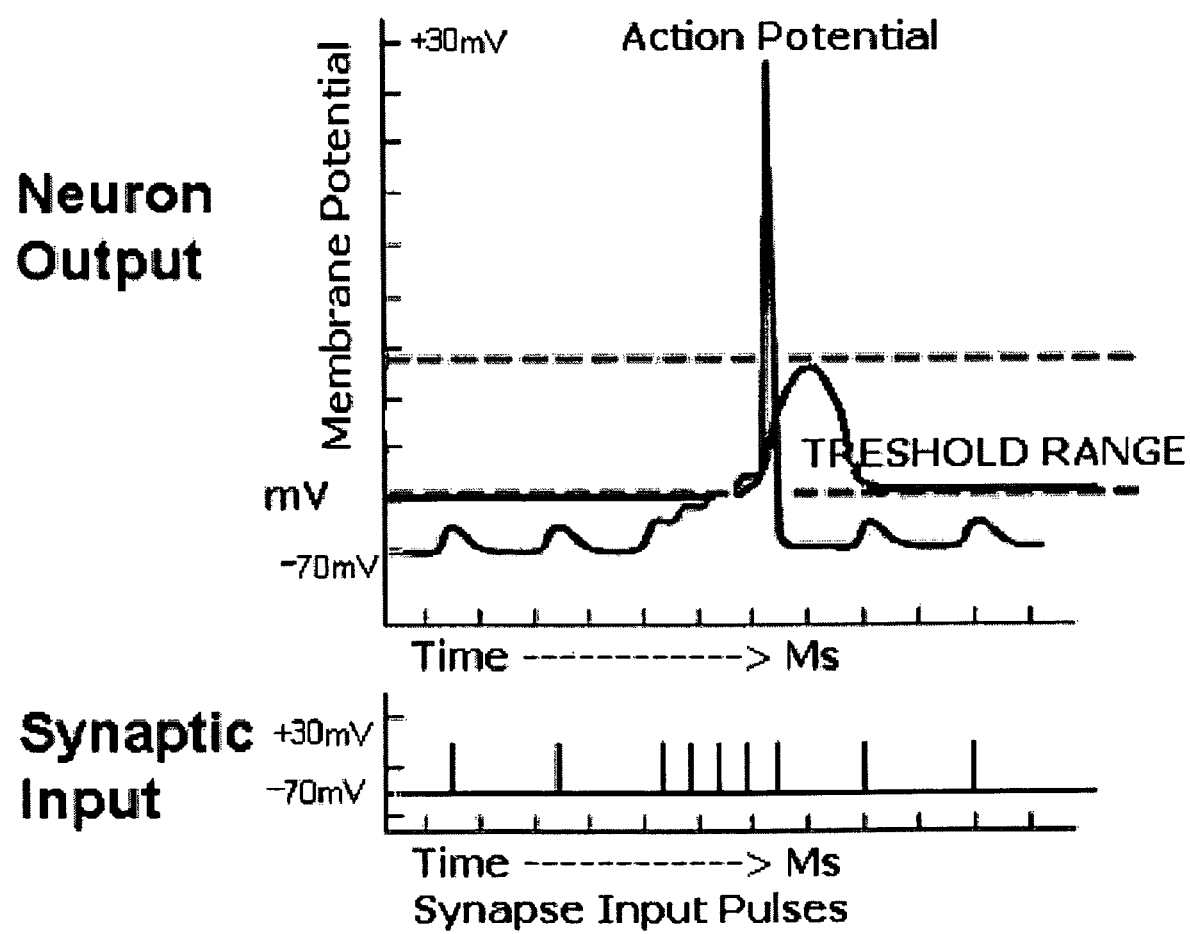
FIGURE 10: Biological Neuron Response

AUTONOMOUS LEARNING DYNAMIC ARTIFICIAL NEURAL COMPUTING DEVICE AND BRAIN INSPIRED SYSTEM

TECHNICAL FIELD OF THE INVENTION

The present invention relates to the processing of information by means of an array consisting of a plurality of dynamic artificial neurons, connected as a hierarchical artificial neural network, and more particularly, to neural network models that simulate or extend biological neural networks. Autonomous learning occurs when a synaptic strength value within the array is increased or decreased as a result of the temporal difference of an input pulse related to a soma feedback output pulse.

BACKGROUND OF THE INVENTION

A biological nervous system comprises a complex network of neurons that receive and process input signals received from external stimuli to process and store information. A biological nervous system can be described as a large hierarchical array forming a probable content addressable associative memory. A neuron is a specialized cell capable of communicating with other cells. A neuron can be described as a cell body called soma, having one or more dendrites as terminals for input signals and an axon as an output terminal. One dendrite of a neuron and one axon of another neuron are connected by a biological structure called a synapse. The soma of a neuron produces a variable set of pulses of a particular frequency and interval known as action potentials when triggered by a signal or the sum of potentials received from a plurality of synapses, connected to dendrites, thereby allowing one neuron to communicate with a plurality of other neurons. Synapses can be excitatory or inhibiting. In this manner a neural network comprises a plurality of neurons that are interconnected by synapses. A plurality of networked neurons is triggered in an indicative spatial and temporal activation pattern as a result of a specific input signal pattern. Each input pulse relates to an event. An event can be described as the occurrence of a specific frequency in an audio stream, the occurrence of a dark to light transition in visual information, and a plethora of other phenomena. Feedback of output pulses to synaptic inputs drives a process known as Synaptic Time Dependent Plasticity, commonly abbreviated as STDP, whereby the strength of a synapse is modified depending on the temporal different of input to output pulses. This process is thought to be responsible for learning and memory functions in the brain. Massive feedback connections attach neurons at lower layers to events at higher regions. Event phenomena at higher levels in the hierarchy are more complex. Instead of triggering on the occurrence of a specific frequency, the inputs to a higher-level neuron represent the combined output of neurons at lower levels and it triggers on a phoneme. A brain can be modeled as a neural network with massive feed-forward and feedback connections, which processes information by the spatial and temporal activation pattern of neurons in the network. The human brain contains an estimated $10^{11}$ neurons interconnected through an estimated $10^{14}$ synaptic connections.

One description of the operation of a general neural network is; a context addressable associative memory system wherein the content is dynamically derived from the probability of input patterns to stored synaptic strengths. An action potential is generated in the post-synaptic neuron when an input pulse causes sufficient positively charged neurotransmitters to be released into the synaptic deft. The synaptic cleft is the space between the synapse and the dendrite of a neuron cell. The synaptic potentials of all synapses are integrated to produce a summed membrane potential. The membrane potential is slowly discharging towards the rest state, and temporally recharged by subsequent pulses. Inhibiting synapses have the opposite effect, causing the membrane potential to be lowered toward, or below the rest potential and making it less likely that the soma will produce an action potential. The neuron soma produces an action potential when the rate of discharge and subsequent recharging results in a membrane potential that matches or exceeds a predefined but variable threshold. The neuron generates a pulse train that has a typical duration and interval period. This pulse train then propagates through one or more axons to the synapses of other neurons. Each neuron secretes only one particular neurotransmitter, which is either excitatory or inhibiting. Feedback channels modify the properties of the neuron to strengthen or weaken the interaction between neurons and cause a variation in the membrane threshold value. Action potentials form precise temporal patterns or sequences as spike trains. The temporal properties of spikes are indicative of the selection of specific neurons within the hierarchy in a process referred to as 'Neuro-percolation'. The coordinated activity of a large section of the population of neurons is required to express information in a biological neural network. The above process forms the basis for information processing, storage, recall and exchange in biological neural networks.

PRIOR ART

First Generation artificial neural networks were based on the simplified neural model of Warren S. McCulloch and Walter Pitts. The McCulloch-Pitts neuron was presented in their 1943 paper "A Logical Calculus of Ideas Immanent in Nervous Activity". The McCulloch-Pitts neuron is also know as a Threshold Gate, which takes a plenitude of Boolean inputs and returns a single Boolean output. The output is logic '1' when the inputs are greater or equal to a defined threshold value. The transfer function is a logic AND, OR or NOT function. First generation neural networks used the McCulloch-Pitts neuron as the basic computation unit in a single layer without feedback.

Second generation artificial neural networks are based on McCulloch-Pitts neurons modified to use a sigmoid activations function and a continuous set of possible output values. In 1957 the 'Perceptron', also known as the MARK1 was presented at the Cornell Aeronautical Laboratory, in a paper by Frank Rosenblatt. The Perceptron is a single-layer, feed-forward artificial neural network.

Third generation artificial neural networks are based on 'integrate and fire' neurons, whereby the synaptic strength is expressed as a static value. Such networks are trained by manually or programmatically adjusting this static value. Most neural network models are based on the following three assumptions. Firstly, the efficacy of a synapse in generating a synaptic potential is assumed to be static for a resulting action potential in neurons. The efficacy of a synapse is essentially a constant. Certain models modify this assumption by allowing a slow variation over a period of processing many variables. In the second assumption, each sending neuron provides the same signal to all other neurons to which it is connected by some means. Thirdly, the network is trained by direct or indirect manual means. Most networks are feed-forward networks with no feedback.

A common artificial neural network used in predictive and analysis machines is the Hopfield network. Nodes in a Hopfield network are static binary threshold units. The output Alpha$_i$ of a unit can either be logic 1 or logic 0, if the summed input exceeds the threshold value Phi: E represents the energy of the junction. Wij is the strength of the connection. S is the state of unit j and Phi is the threshold value. A Hopfield network stabilizes at the minimum energy level at all junctions. Boltzmann machines add an annealing factor to the Hopfield equation. Boltzmann machines are capable of learning limited internal representations.

In previous instances of neural networks many of the neuron functions have been compromised in order to force functional results. This compromise has resulted in dedicated machines while the biological model is in contrast adaptive. The mentioned networks are based upon antiquated models of biological neurons whereby the temporal character of activation patterns and the functions of feedback and inhibition are largely ignored. The model that is presented here removes these assumptions allowing the construction of adaptive autonomous learning neural networks.

SUMMARY OF THE INVENTION

One embodiment of a system for information processing includes a plurality of synapse circuits and a neuron soma connected to communicate with one another and configured in a hierarchical array to produce at least one output signal in response to at least one input signal.

One aspect of the present invention provides an improved neural network model that removes the above described assumptions and enables the network to autonomously learn to perform complex tasks. The present invention includes information processing systems and methods that are inspired by and are configured to extend certain aspects of a biological neural network. The combined functions of a plurality of synaptic circuits connected to a neuron soma circuit, jointly called an artificial neuron, correspond to biological synapses and a neural soma, respectively. Construction of the artificial neuron array from standard binary logic gates, whereby analogue values are simulated in registers, has allowed the creation of large arrays in VLSI devices using current state of the art semiconductor manufacturing techniques.

Each of the synaptic circuits may comprise any one or a combination of sensory devices such as a multi-element microphone, an artificial cochlea, a multi-element optical device, a biological unit, or a chemical material.

Depending on synaptic strengths that are the result of learning and the artificial neuron previous activation history, different artificial neurons in general respond differently to the same input signal. The output of each artificial neuron provides a probability that the spatial and temporal input pattern closely approximates a pattern that was learned previously, and is indirectly represented in the strength values stored in the synapses. This produces different output signals, selecting a group or several groups of interneurons which in turn perform similar temporal probability functions and so on up the hierarchy. This provides a specific way of transforming a spatial-temporal pattern consisting as a signal train of spikes into a hierarchical spatial-temporal pattern of activation that increases in complexity as the data is progressed through the hierarchy, and correspondingly reduces data intensity. Concurrently the hierarchical network of neurons and inter-neurons is learning to respond to certain spatial-temporal characteristics of input signals. Learning occurs autonomously, and is derived from a biological process known as Synaptic Time Dependent Plasticity or STDP. This learning method involves a synapse strength value that determines the coupling factor between neurons. The synaptic strength value is increased when the input pulse precedes the output pulse and decreased when the output pulse precedes the input pulse.

The synapse strength value increase is greatest at the shortest interval between the input pulse and the occurrence of an output pulse. The synapse strength value decrease is greatest at the shortest interval between an output pulse and an input pulse.

BRIEF DESCRIPTION OF THE DRAWINGS

Index:

FIG. 1: Artificial Synapse block diagram

FIG. 1a: CAD system drawing: Circuit diagram of artificial synapse PSP circuit.

FIG. 1b: CAD system drawing: Circuit diagram of artificial synapse STDP circuit.

FIG. 1c: CAD system Logic Simulator screen shot: Artificial Neuron circuit waveforms FIG. 2: CAD system drawing: Circuit diagram of Artificial Soma circuit FIG. 3: n Synapses circuits connected to a Soma circuit forming a single neuron FIG. 4: Artificial Neuron Array device circuit consisting of multiple neurons FIG. 5: CAD system, Logic simulator screen shot synapse circuit waveforms FIG. 10: Biological synaptic input pulses and neuron action potential response

DETAILED DESCRIPTION OF THE PREFERRED EMBODIMENT

Figure 6:
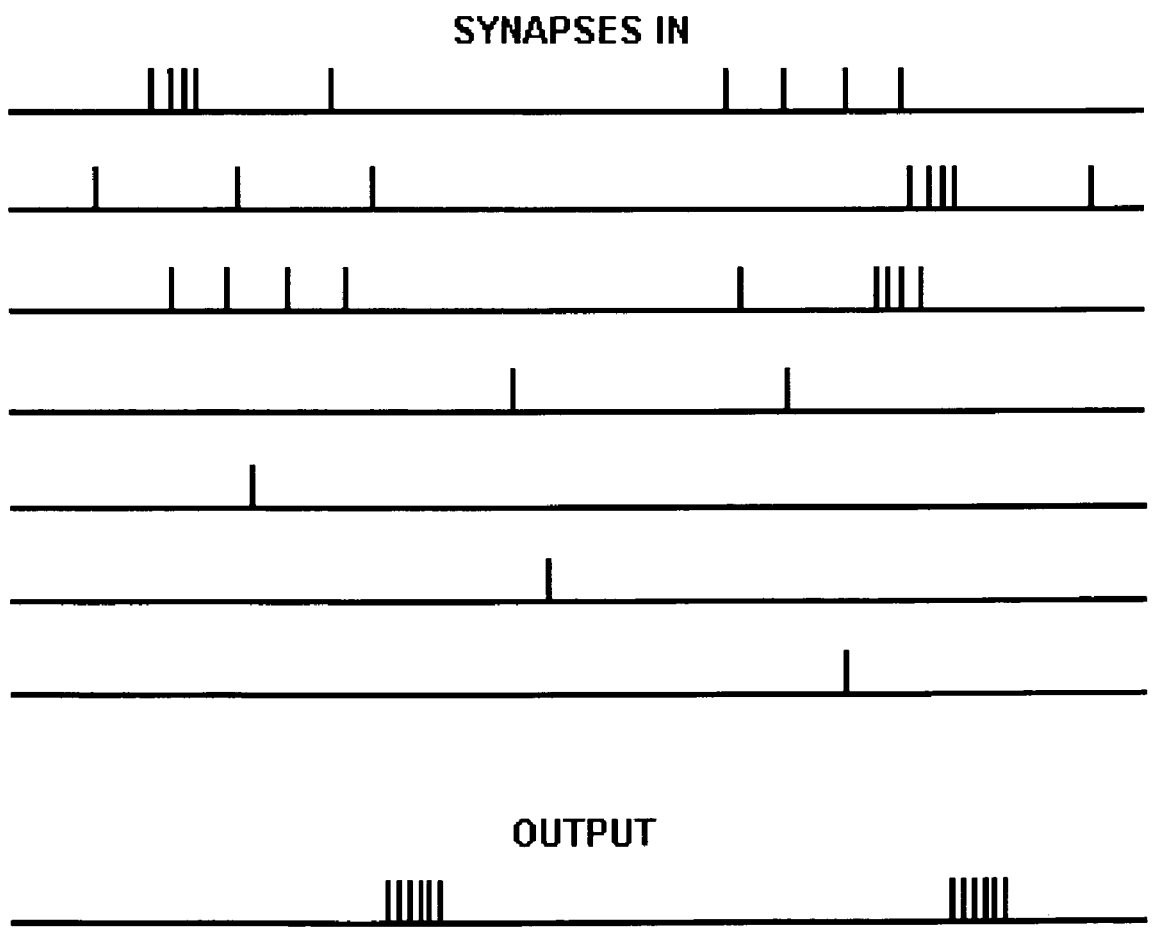
FIG. 6: Simulation of synaptic output and soma pulse train output
Figure 8:
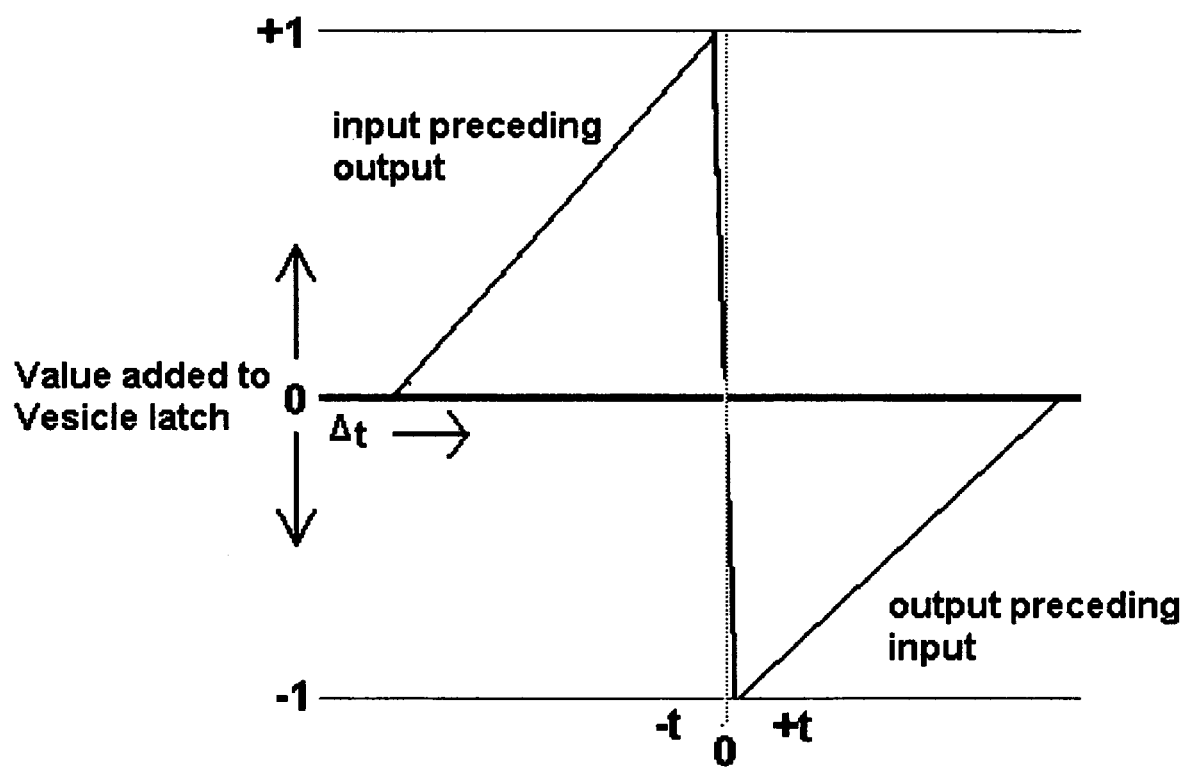
FIG. 8: Representation of Synapse time dependent plasticity (STDP) circuit response

In the preferred embodiment a plurality of soma circuits is connected through a plurality of dynamic synapse circuits in a hierarchical array. An artificial neuron consists out of at least one synapse circuit and one soma circuit. The synapses receive input pulses derived from other artificial neurons including artificial neurons that are connected to sensory devices. The soma produces an action potential when the synaptic inputs approximate a previously learned pattern, and whereby different artificial neurons produce different output pulses given the same input signals. One instance of neuron input waveforms and a response is shown in FIG. 6. The synapse circuit exhibits dynamic behaviour. The synapse strength is altered according to the graph shown in FIG. 8. In FIG. 8, the time difference Delta t is directly related to the artificial neuron clock speed. The synapse strength is increased when the artificial neuron synaptic input pulse precedes the soma output pulse by time t and by a value varying between −1 and +1 shown in the graph margin. The synapse strength is decreased when the artificial neuron soma output pulse precedes the synaptic input pulse and thus did not contribute to the membrane potential that caused the output pulse. The decrease value is a function of time which is shown in the graph in FIG. 8. In biological neural systems a soma output pulse is described as an action potential, and occurs when the membrane potential reaches a certain threshold.

Figure 7:
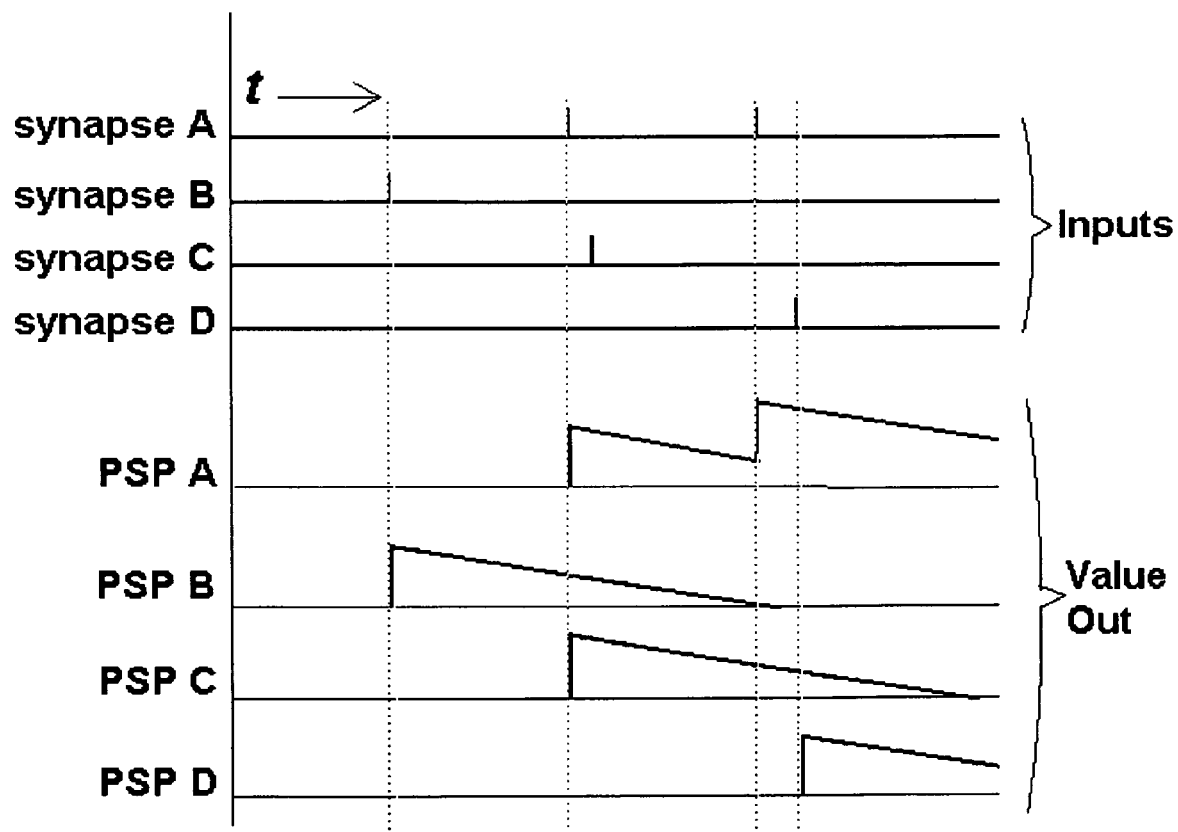
FIG. 7: Response of each synapse circuit to a series of input pulses
Figure 9:
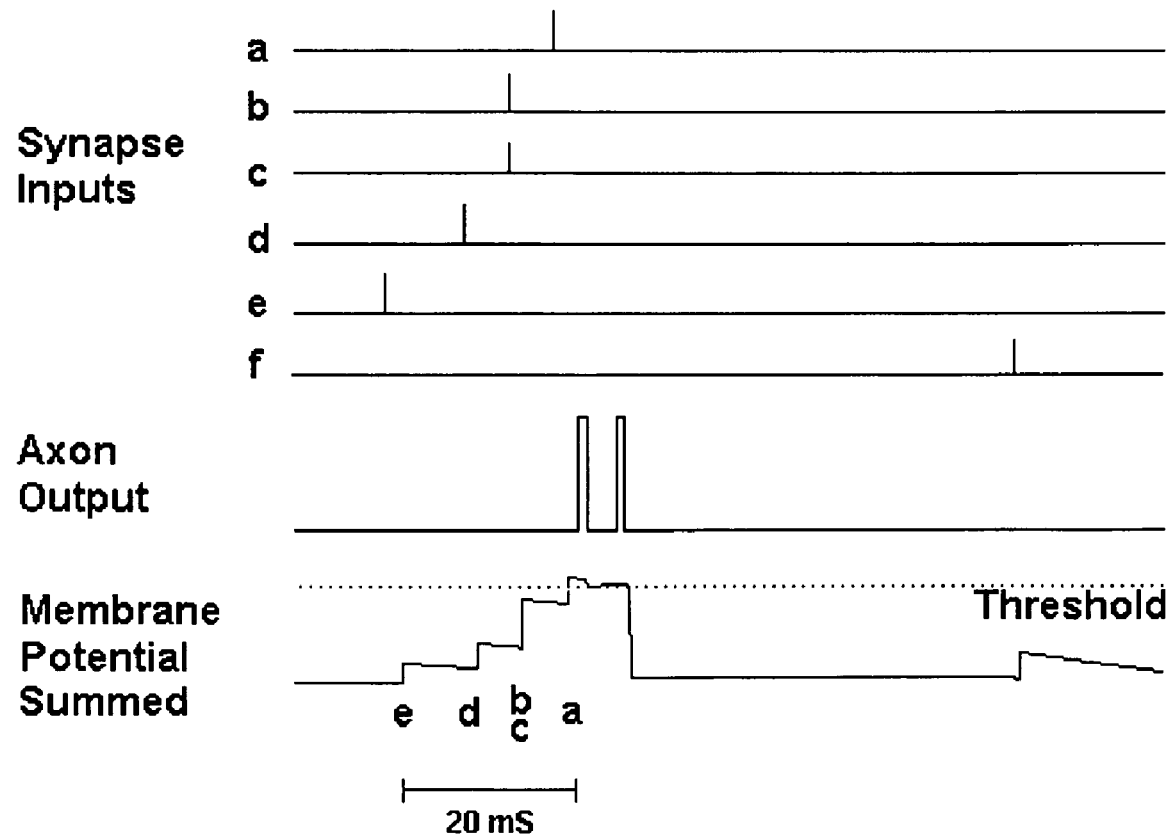
FIG. 9: Artificial Neuron Membrane Potential value relative to synaptic inputs

FIG. 10 shows a graph representing a typical biological neuron action potential in response to an input pulse train. The input pulse train is shown below the action potential graph. The membrane potential is increased each time an input pulse occurs. A number of input pulses are required to bring the membrane potential within the threshold range, at which time an action potential is generated. FIG. 7 shows the input signals to four artificial synapses and the corresponding output before integration, labeled PSP A to PSP D. According to the biological neuron response shown in FIG. 10, the output value is increased in response to an input pulse. Signals PSP A to PSP D are integrated to form a simulated membrane potential value. FIG. 9 shows an integrated "Membrane Potential" in relation to synapse inputs {a.b.c.d.e.f} and the resulting action potential labeled "Axon Output".

What follows is a detailed description of the operation of one embodiment of the artificial neuron.

Synapse Circuit

In the preferred embodiment a plurality of synapse circuits is provided, constructed from standard Boolean logic gates within a device. Referring to the synapse 'PSP' circuit diagram in FIG. 1a, the input pulse signal (SYNIN) is conditioned to be the duration of at least one clock signal cycle by a pair of Flip-Flop circuits. The SYNIN input signal is connected to both the STDP circuit in FIG. 1b and the Post Synaptic Potential (PSP) circuit. The output value of all synapse PSP circuits are integrated in an array adder circuit and input to the Soma circuit and forms then the artificial neuron membrane potential value.

The PSP circuit in FIG. 1a comprises a down-counter circuit COUNTER that is inhibited when the count reaches zero by four 3-input OR gates. The delayed and conditioned SYNIN signal is connected to the Synchronous LOAD input of COUNTER and causes the counter to be loaded with the contents of register PARLOAD_LATCH9. The PARLOAD_LATCH9 register contents is comprised of the output of counter circuit COUNT added with the value output by the circuit in FIG. 1b designated VESICLE[7:0]. This simulates the increase in Post Synaptic Potential caused by the insertion of vesicles into the synaptic deft. Counter circuit COUNT is decremented one every subsequent dock period. The COUNT value is output to the soma circuit and represents the Post Synaptic Potential or PSP. Each of the PSP values output by the synapse is integrated in the SOMA circuit and forms an artificial neuron Membrane Potential value The STDP circuit diagram in FIG. 1b comprises a circuit labeled '1STPULSE' used to determine which of two pulses occurred first. The SYNIN signal and the FEEDBACK signals are input to the '1STPULSE' circuit. The FEEDBACK signal is the soma output pulse signal.

Three separate signals and a multi-bit value are output by the 1STPULSE circuit, comprising ADD_SUB, OUT2ND, OUT1ST and a COUNT{n} value. The COUNT{n} value represents the inverse proportional difference in time between input pulses SYNIN and FEEDBACK, whereby the value is greatest if the two pulses coincide and decreasing in value as the time between the pulses increases. The ADD_SUB signal is logic 1 when the SYNIN signal precedes the FEEDBACK signal and is logic 0 when the FEEDBACK signal precedes the SYNIN signal. The OUT2ND signal is equivalent to the second signal to occur out of input pulses SYNIN and FEEDBACK The OUT1ST signal is equivalent to the first signal to occur out of input pulses SYNIN and FEEDBACK. In the preferred embodiment these signals are used to control an adder circuit ADDSUB8 whereby the COUNT value is added or subtracted from the contents of register REG8LE. Register REG8LE contains a value that represents the VESICLE count, simulating the number of vesicles that are released into the synaptic cleft and which represents the strength of the synapse. An external microprocessor can read or initialize the contents of register REG8LE.

This process can be further explained by referring to block diagram in FIG. 1. Block diagram FIG. 1 shows the major components of the synapse. An example pulse train {a.b.c.d.e.}, shown in a balloon on the top right hand side, is input to the circuit. On each pulse, DOWNCOUNTER is parallel loaded with the SUM value of the current value contained in DOWNCOUNTER and the value contained of the VESICLE LATCH register, added in PARALLEL ADDER. On each dock pulse the DOWNCOUNTER is decremented, thus simulating a leaky integrator. The content of VESICLE LATCH is incremented or decremented by a value determined in the PULSE TIMING circuit whenever a FEEDBACK pulse occurs. In the preferred embodiment the PULSE TIMING value is between 0 and 15. The VESICLE LATCH value is decremented when the output pulse precedes the input pulse. In such case the input pulse has clearly not contributed to the generated output pulse. The VESICLE LATCH value is incremented when the input pulse precedes the output pulse. In such case the input pulse has contributed to the generated output pulse, and the synapse is strengthened.

FIG. 1c shows a chart of waveforms representing the input and output waveforms of certain parts within the preferred embodiment of the dynamic artificial neuron. The waveforms were generated using the circuit diagrammes and shown in FIG. 1a, FIG. 1b and FIG. 2 and associated VHDL code, and using Mentor Graphics ModelSim software which is part of the Actel Libero™ version 8.3 FPGA design suite. The chart signals labeled SYNA and SYNB are two input signals to two synapse circuits. A0 to A3 are four clock signals derived from input signal CLK. DC_DELAY is the value loaded into DOWNCOUNTER. Cl_dc and ld_dc are two internal signals used to control the DOWNCOUNTER circuit. PSP_OUTA and PSP_OUTB are the simulated Post Synaptic Potential values generated respectively by Synapse circuit A and Synapse circuit B. AXON_OUT is the axon output signal. From this chart it can be observed that the circuit generates an output, relative to the timing of synaptic inputs, in this case Synapse A and Synapse B whereby synapse B is the input with the higher strength value. The output value PSP_OUTB alone is sufficient to cause the soma circuit to generate an output when PSP_OUTA reverts to 0. It must be stressed that this is only true in this one particular case in the preferred embodiment, whereby a high strength value in the VESICLE_COUNT register of synapse circuit B was inserted.

FIG. 5 shows the waveforms that are generated in synapse and array adder circuit the preferred embodiment of the invention. The PSP_OUT signal is the sum of the PSP_IN value generated by the previous synapse and the D value generated by this synapse. The SYNIN signal is the input to the synapse. Inhibit is a signal that is logic 0 to indicate that this is a inhibiting synapse, and a logic 1 to indicate that the synapse is excitatory. CAPLUS is a value that indicates the total available neurotransmitters in the synapse. Vesicle depletion occurs if this value is zero.

Soma Circuit

In the preferred embodiment a plurality of synapse circuits is connected to a soma circuit. Referring to FIG. 2, the MEMBRANE VOLTAGE SUM input represents the integrated value of the output value of all connected synapses. This is a summed value that comprises both inhibiting and excitatory synapse output values. The SENSITIVITY input is the current threshold value derived from previous activation history.

They are input to a comparator labeled SOMAGATE which produces an output A.GE.B (A Greater or Equal to B). Device PULSEREGISTER contains the output pulse interval. The PULSEREGISTER value is loaded into counter DOWNCOUNT on the occurrence of the A.GE.B pulse. The AXON_OUT output is active for one clock cycle when counter DOWNCOUNT reaches zero. Counter DOWNCOUNT counts down from its current value and the process repeats, causing the AXON_OUT output to be active each time the counter DOWNCOUNT reaches zero and is loaded with the current value contained in register PULSEREGISTER.

Figure 2A:
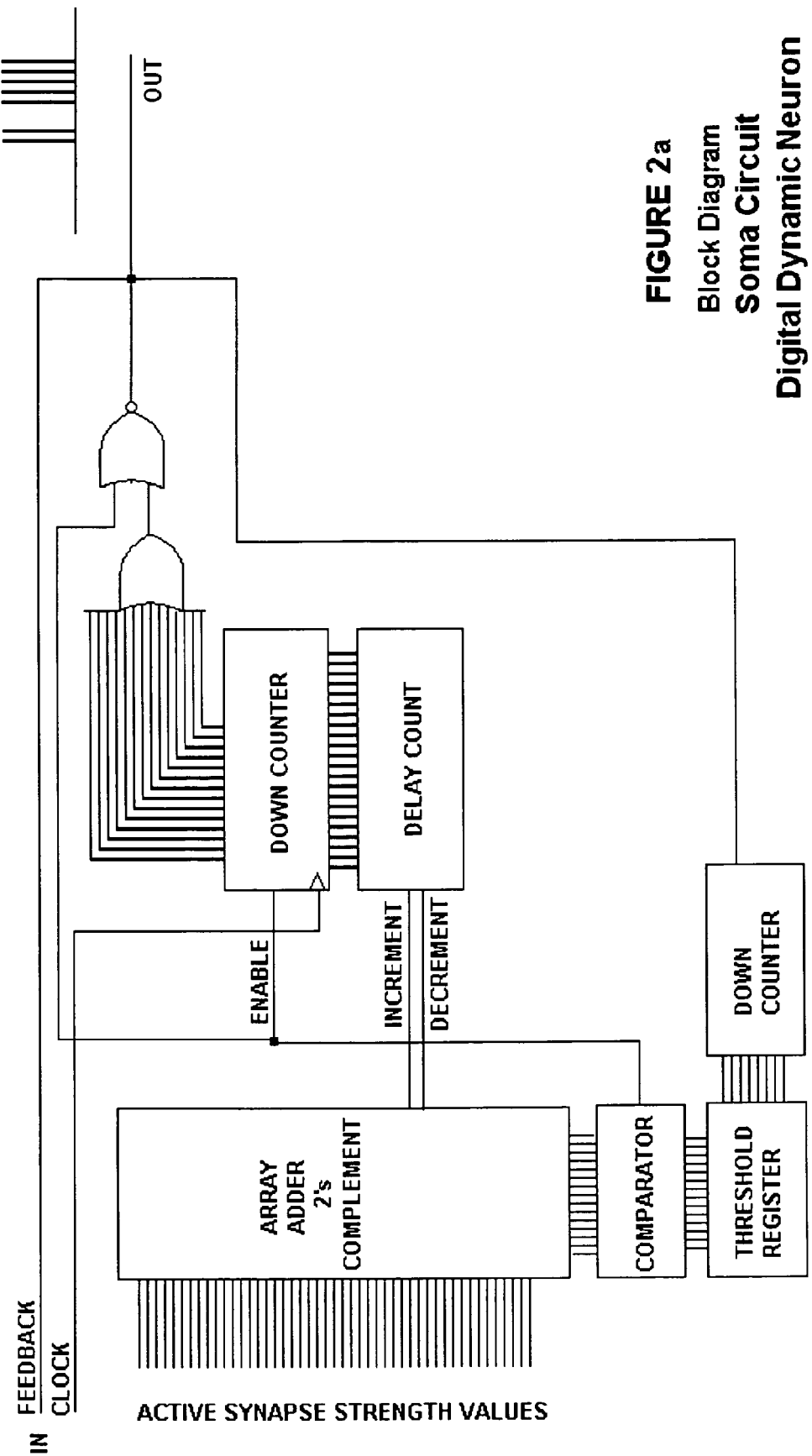
FIG. 2a: Artificial Soma block diagram

The Soma circuit operation can be further explained referring to block diagram in FIG. 2a. ARRAY ADDER is a custom part developed in VHDL to add a large number of 2-complement synapse output values labeled SUM_OUT to form an artificial membrane potential labeled SUM. The SUM output of the ARRAY ADDER circuit is input to a comparator and compared to the output of a Down-Counter. The DOWN-COUNTER circuit is loaded with a PRESET value. The DOWN-COUNTER circuit is controlled by the soma OUTPUT signal and a clock signal labeled CLK. An output pulse representing an action potential is generated each time the DOWN-COUNTER reaches zero. The number of pulses and the interval between pulses that are generated is a function of the PRESET value and the time delay parameter that specifies when the membrane potential value returns to zero.

Neuron Circuit

In the preferred embodiment the neuron circuit consists of one soma circuit and at least one synapse circuit. Referring to FIG. 3, in the preferred embodiment a neuron comprises one soma and an unlimited number of synapse circuits designated with n. There is no theoretical limitation to the number of synapses that can be connected to a soma circuit. The integration circuit is constructed from individual adder circuits that are incorporated within the synapse circuit and connected to form an array adder circuit. The number of connected synapse circuits is therefore flexible. Drawing 3 shows ten synapses and synapses ( . . . n) connected to an array adder. The integrated sum is input to the soma circuit shown in FIG. 2. Soma control constitutes a circuit that increases the threshold potential for a period after the soma has fired.

Figure 3A:
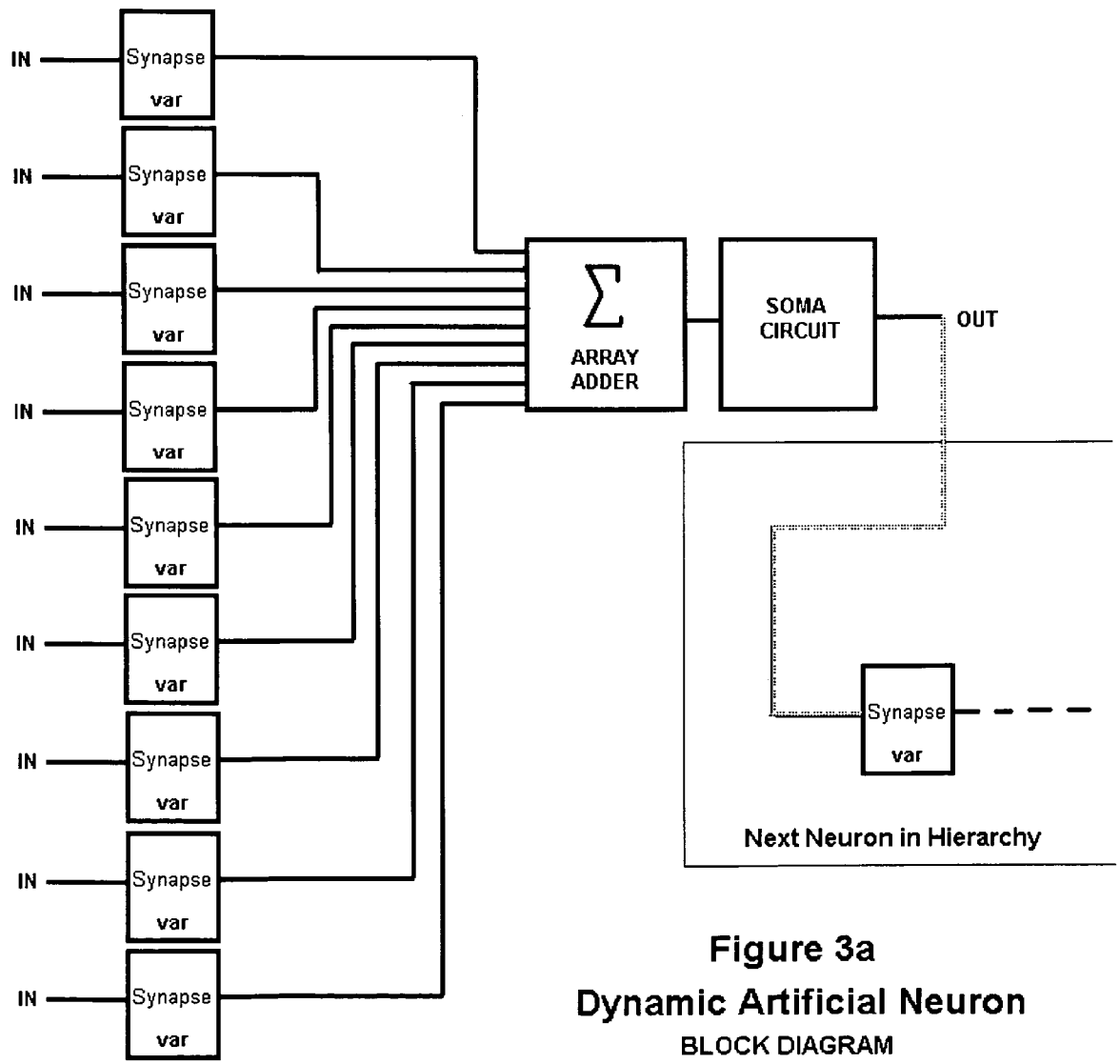
FIG. 3a: Dynamic Artificial Neuron block diagram

The neuron circuit operation can be further explained referring to block diagram in FIG. 3a. In FIG. 3a the Post Synaptic Potential output value of nine synapses, each incorporating a variable strength parameter "var", are connected to an array adder circuit producing a membrane potential value. The membrane potential is input to the soma circuit which generates an output pulse or pulse train when the membrane potential reaches or exceeds a variable threshold potential value. The soma output pulse is connected to a synapse of the next neuron in the hierarchy, or a plurality of synapses.

Dynamic Artificial Neuron Array (Dan Array) Circuit

In the preferred embodiment, the Dynamic Artificial Neuron array comprises a plurality of artificial neurons as described above, organized in a hierarchical array. In one embodiment the stored parameters in the array are accessible by a micro-processor to seed the array with synaptic strength and soma timing values. FIG. 4 refers to a device containing a number of artificial neurons that are externally connected and wherein each synapse input and soma output is accessible.

The invention claimed is:

1. An information processing system intended for use in artificial intelligence and having a plurality of digital artificial neuron circuits connected in an array, the system comprising a plurality of digital dynamic synapse circuits, wherein each digital dynamic synapse circuit contains a binary register that stores a value representing neurotransmitter type and level, wherein the digital dynamic synapse circuits comprise a means of learning and responding to input signals, either by producing or compounding the value, thereby simulating behavior of a biological synapse; and a temporal integrator circuit that integrates and combines each individually simulated synapse neurotransmitter type and value over time, wherein time is dependent on the neurotransmitter type stored in each digital dynamic synapse circuit.

2. An artificial neuron circuit in accordance with claim 1, integrated value is periodically decremented thus simulating a leaky integrator.

3. An artificial neuron circuit in accordance with claim 1, whereby the soma threshold value is increased or decreased as a result of feedback.

4. An artificial neural circuit in accordance with claim 1, whereby the value stored in each digital dynamic synapse circuit is increased or decreased relative to the timing difference in the synapse input pulse to the integrated value.

5. An array consisting of a plurality of artificial neural network circuits in accordance with claim 4, whereby the altered state of synapses causes the system to respond to, and learn new activation patterns and reinforce previously learned activation patterns through repetition of an approximated stimulus pattern.

6. An artificial neural circuit in accordance with claim 1, wherein one or more pulses are generated when the integrated value has reached or exceeded a stored variable threshold value, wherein an output pulse interval period between pulses is a function of an artificial membrane potential value and a current threshold level value, and is representative of the probability of a learned temporal pattern existing at the input of the circuit.

7. An array or matrix consisting of a plurality of artificial neural network circuits in accordance with claim 1, connected to communicate with one another and configured to produce an output signal.

8. An array consisting of a plurality of artificial neural network circuits in accordance with claim 1, connected to a microprocessor device to monitor activity within the array and output data to an external microprocessor device or peripheral device.

9. An array consisting of a plurality of artificial neural network circuits in accordance with claim 1, whereby the array performs a simulation of the processes that occur naturally in a biological brain.

10. An information processing system in accordance with claim 1, whereby the integrated digital value represents membrane potential value of a biological neuron.

11. An information processing system in accordance with claim 1, further comprising a digital artificial neuron for producing one or multiple pulses when the temporal integrated value has reached or exceeded a variable threshold value stored in a register within a soma circuit.

12. An information processing system in accordance with claim 1, whereby a binary counter periodically decrements a binary register containing the neurotransmitter type and level and thus simulating the temporal integration of input pulses seen in a biological neuron.

13. An information processing system in accordance with claim 1, wherein a binary register simulating a soma threshold value is increased or decreased as a result of time elapsed since occurrence of a digitally generated output pulse.

14. An information processing system in accordance with claim 1, wherein the neurotransmitter level stored in the binary register is increased or decreased relative to the timing difference between the synapse input pulse relative to a soma output pulse.

15. An information processing system in accordance with claim 14, wherein the altered state of synapses causes the system to respond to, and learn new activation patterns and reinforce previously learned activation patterns through repetition or the intensity of the approximated stimulus pattern.

16. An artificial neural circuit in accordance with claim 1, whereby an output pulse interval period is a function of the integrated value and present value of a threshold level register, and is representative of the probably of a learned temporal pattern existing at the input of the circuit.

17. An array or matrix consisting of a plurality of artificial neural network circuits in accordance with claim 1, wherein each input pulse recalls its value that is stored in a binary register.

18. An array consisting of a plurality of artificial neural network circuits in accordance with claim 1, connected to a microprocessor device and mapped as memory enabling the microprocessor program to upload, download and to store training sets in a library.

19. An array consisting of a plurality of artificial neural network circuits in accordance with claim 1, whereby the array performs a digital simulation of the processes that occur naturally in a biological brain.

* * * * *